US 6,542,965 B2

(12) United States Patent
Lesartre

(10) Patent No.: US 6,542,965 B2
(45) Date of Patent: *Apr. 1, 2003

(54) CACHE LINE REPLACEMENT USING CABLE STATUS TO BIAS WAY SELECTION

(75) Inventor: Gregg B. Lesartre, Fort Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/126,571

(22) Filed: Apr. 19, 2002

(65) Prior Publication Data

US 2002/0120817 A1 Aug. 29, 2002

Related U.S. Application Data

(63) Continuation of application No. 09/442,373, filed on Nov. 17, 1999, now Pat. No. 6,405,287.

(51) Int. Cl.[7] .............................. G06F 12/12
(52) U.S. Cl. ..................... 711/128; 711/133; 711/144; 711/156; 711/159; 711/3
(58) Field of Search ............................ 711/128, 133, 711/144, 134, 156, 159, 3

(56) References Cited

U.S. PATENT DOCUMENTS

| 5,765,199 A | * | 6/1998 | Chang et al. ............ 711/144 |
| 6,047,358 A | | 4/2000 | Jacobs .................... 711/133 |
| 6,185,657 B1 | | 2/2001 | Moyer .................... 711/128 |
| 6,282,617 B1 | | 8/2001 | Tirumala et al. ........ 711/133 |
| 6,401,175 B1 | * | 6/2002 | Tremblay et al. ........ 711/131 |

OTHER PUBLICATIONS

"PA–8500: The Continuing Evolution of the PA–8000 Family" by Gregg Lesartre and Doug Hunt of Hewlett–Packard Company, Fort Collins, Colorado, Feb. 23, 1997, 6 pages.
U.S. patent application Ser. No. 09/442,373, Lesartre, filed Nov. 1999.

* cited by examiner

Primary Examiner—Reginald G. Bragdon
Assistant Examiner—Jasmine Song

(57) ABSTRACT

A method for determining which way of an N-way set associative cache should be filled with replacement data upon generation of a cache miss when all of the ways contain valid data. A first choice for way selection and at least one additional choice for way selection are generated. If the status of the way corresponding to the first choice differs from a bias status, a way corresponding to one of the additional choices is designated as the way to be filled with replacement data. Otherwise, the way corresponding to the first choice is designated as the way to be filled with replacement data. Status information for a given way may include any data which is maintained on a cache line by cache line basis, but is preferably data which is maintained for purposes other than way selection. For example, status information might include indications as to whether a cache line is shared or private, clean or dirty. The algorithm for generating the first choice for way selection is preferably a random or round robin approach, but may be any other algorithm. Any algorithm may also be used for generating the additional choices for way selection. However, the additional choices are preferably generated as functions of the first (e.g., the first choice plus different constants). The bias status which is used to select between the first and at least one additional choices can be programmed to yield different results in different systems.

14 Claims, 4 Drawing Sheets

CACHE LINE REPLACEMENT USING CABLE STATUS TO BIAS WAY SELECTION

CROSS REFERENCE TO RELATED APPLICATION(S)

This is a continuation of application Ser. No. 09/442,373 filed on Nov. 17, 1999, now U.S. Pat. No. 6,405,287 which is hereby incorporated by reference herein.

FIELD OF THE INVENTION

The invention pertains to methods and apparatus for improving computer system performance by improving cache utilization.

BACKGROUND OF THE INVENTION

Most computer systems include a processing unit and a memory. The speed at which the processing unit can execute instructions and consume data depends upon the rate at which the instructions and data can be transferred from memory to the processing unit. In an attempt to reduce the time required for the processing unit to obtain instructions and data from main memory, many computer systems include a cache memory which is physically and logically located between the processing unit and main memory.

A cache memory is a small, high-speed buffer memory which is used to temporarily hold those portions of the contents of main memory which it is believed will be used in the near future by the processing unit. The main purpose of a cache is to shorten the time necessary to perform memory accesses, either for data or instruction fetch. Cache memory typically has access times which are several times faster than those of a system's main memory. The use of cache memory can significantly improve system performance by reducing data access time, therefore enabling a processing unit to spend far less time waiting for instructions and data to be fetched and/or stored.

A cache memory comprises many lines of data which have been copied from a system's main memory. Associated with each cache line is a cache tag. A line's tag provides information for mapping the cache line's data to its main memory address. Each time a processing unit requests an instruction or data from memory, an address tag comparison is made to see if a copy of the requested data resides in the cache. If the desired data is not in the cache, the requested data is retrieved from the main memory, stored in the cache, and supplied to the processing unit. Commonly used mapping functions for cache data storage include direct mapping and associative mapping techniques.

In an N-way set associative cache, a single index is used to simultaneously access a plurality of data arrays. A data array may be implemented by one or more random access memory integrated circuits. A set is a collection of all cache lines addressed by a single cache index. The number of data arrays addressed by a single cache index indicates the "way" number of a cache. For example, if in a cache a single cache index is used to access data from two data arrays, the cache is a 2-way set associative cache. Similarly, if in a cache a single cache index is used to access data from four data arrays, the cache is a 4-way set associative cache.

When a multi-way cache access is made, a tag comparison is made for each data array or way. If a tag comparison indicates that the desired line of data resides in a particular data array, the line of data is output from the cache for subsequent use by the processing unit which requested the data.

Since there are a finite number of lines in a cache, it is frequently necessary to replace the information stored in a cache as new information is needed. However, each time a new line of data is retrieved from main memory, a determination must be made as to which line of data in the cache will be replaced. For an N-way set associative cache, this determination involves selecting the way in which the new line of data will be stored. If one or more ways hold invalid data, then it usually makes sense to fill an invalid way with valid data. However, if all of the ways hold valid data, a line of data must be bumped from the cache. In an ideal cache, it would be desirable to 1) retain valid lines of data which are most likely to be used again by a processing unit, 2) retain valid lines which are expensive to move around, and 3) replace valid lines which are inexpensive to move around. Since replacement of cache data is a relatively slow process in comparison to cache data retrieval, it is desirable to make as meaningful of a way selection as is possible given one's speed, space and budget constraints.

There are many algorithms for improving cache utilization via better way selection for replacement data. However, one of three general approaches is commonly used. The first approach is a "random" approach, in which new information is written into a randomly or pseudo-randomly selected way. Another approach is a "round robin" approach, in which the way to be filled with replacement data is simply the previously replaced way plus some constant. A third approach is to replace the "least recently used" way with replacement data. The first two methods yield acceptable results with a minimal performance penalty, little hardware, and little cost. The least recently used method achieves better performance, but with significant and costly hardware.

What is needed is a new method for determining which way of an N-way set associative cache should be filled with replacement data upon generation of a cache miss when all of the ways contain valid data. The new method needs to provide better cache utilization than a simple random or round robin approach, but needs to be less costly to implement than a least recently used approach.

SUMMARY OF THE INVENTION

In achievement of the foregoing need, the inventor has devised new methods and apparatus for determining which way of an N-way set associative cache should be filled with replacement data upon generation of a cache miss when all of the ways contain valid data. As previously stated, when some way contains invalid data, that way is the preferred target for replacement.

The methods and apparatus generate a first choice for way selection and at least one additional choice for way selection, and then use status information associated with the cache line corresponding to the first choice to determine whether the first choice or one of the at least one additional choices should be used to designate the way which will be filled with replacement data. Status information may comprise any data which is maintained on a cache line by cache line basis, but is preferably data which is maintained for purposes other than way selection. For example, status information might comprise indications as to whether a cache line is shared or private, clean or dirty.

In one embodiment of the invention, a first choice for way selection is generated using any available method. However, the method is preferably one that is simple and cost-effective to implement (e.g., random or round robin). A second choice for way selection is then derived from the first (e.g., the first choice plus some fixed constant). If the status of the way corresponding to the first choice differs from a bias status, the way corresponding to the second choice is designated as the way to be filled with replacement data. Otherwise, the way corresponding to the first choice is designated as the way to be filled with replacement data.

The bias status which is used to select between the first and second choices can be programmed to yield different results in different systems. For instance, a computer system with limited memory bus bandwidth relative to its processing unit's capacity to execute instructions and consume data might perform better if the bias status favors replacing clean lines over dirty lines, or shared lines over private lines.

In a system comprising two or more processors which operate on data stored in a shared main memory, where data produced by one processor is consumed by another, it might be beneficial to program the bias status so that dirty lines are favored for replacement. In this manner, data needed by the second processor is more likely to be found in main memory rather than the first processor's private cache, and the second processor can retrieve the data more readily.

These and other important advantages and objectives of the present invention will be further explained in, or will become apparent from, the accompanying description, drawings and claims.

BRIEF DESCRIPTION OF THE DRAWINGS

Illustrative and presently preferred embodiments of the invention are illustrated in the drawings, in which.

DESCRIPTION OF THE PREFERRED EMBODIMENTS

Figure 3:
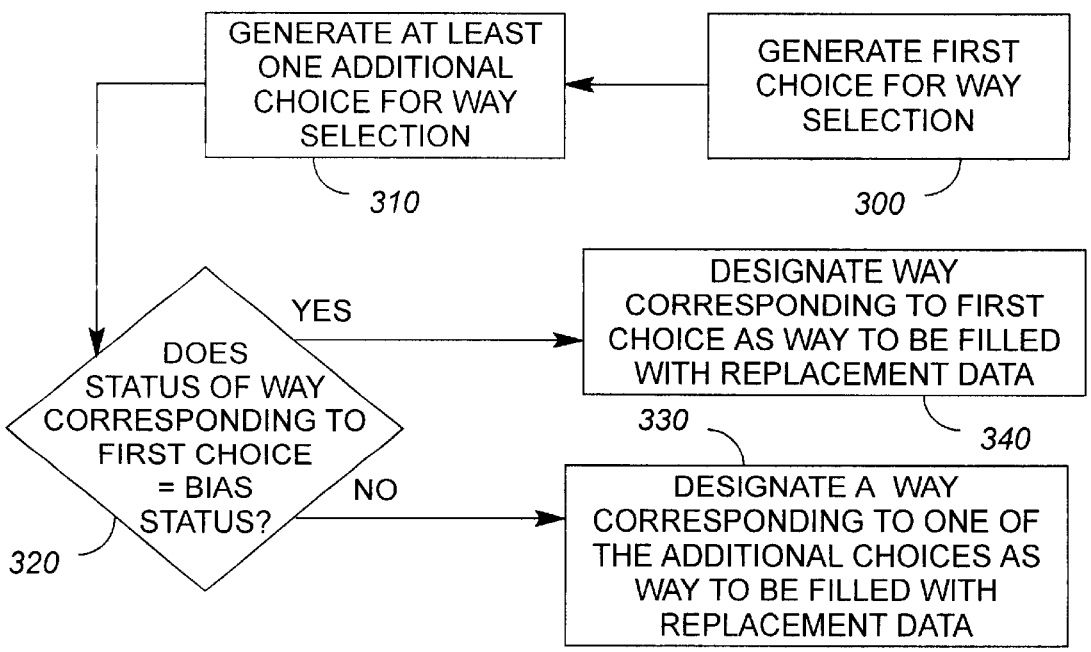
FIG. 3 illustrates a first method for determining which way of an N-way set associative cache should be filled with replacement data upon generation of a cache miss when all of the ways contain valid data.

A method for determining which way of an N-way set associative cache should be filled with replacement data upon generation of a cache miss when all of the ways contain valid data is generally illustrated in FIG. 3. The method comprises generating a first choice for way selection 300 and at least one additional choice for way selection 310. If the status of the way corresponding to the first choice differs from a bias status 320, a way corresponding to one of the additional choices for way selection is designated as the way to be filled with replacement data 330. Otherwise, the way corresponding to the first choice is designated as the way to be filled with replacement data 340.

Figure 4:
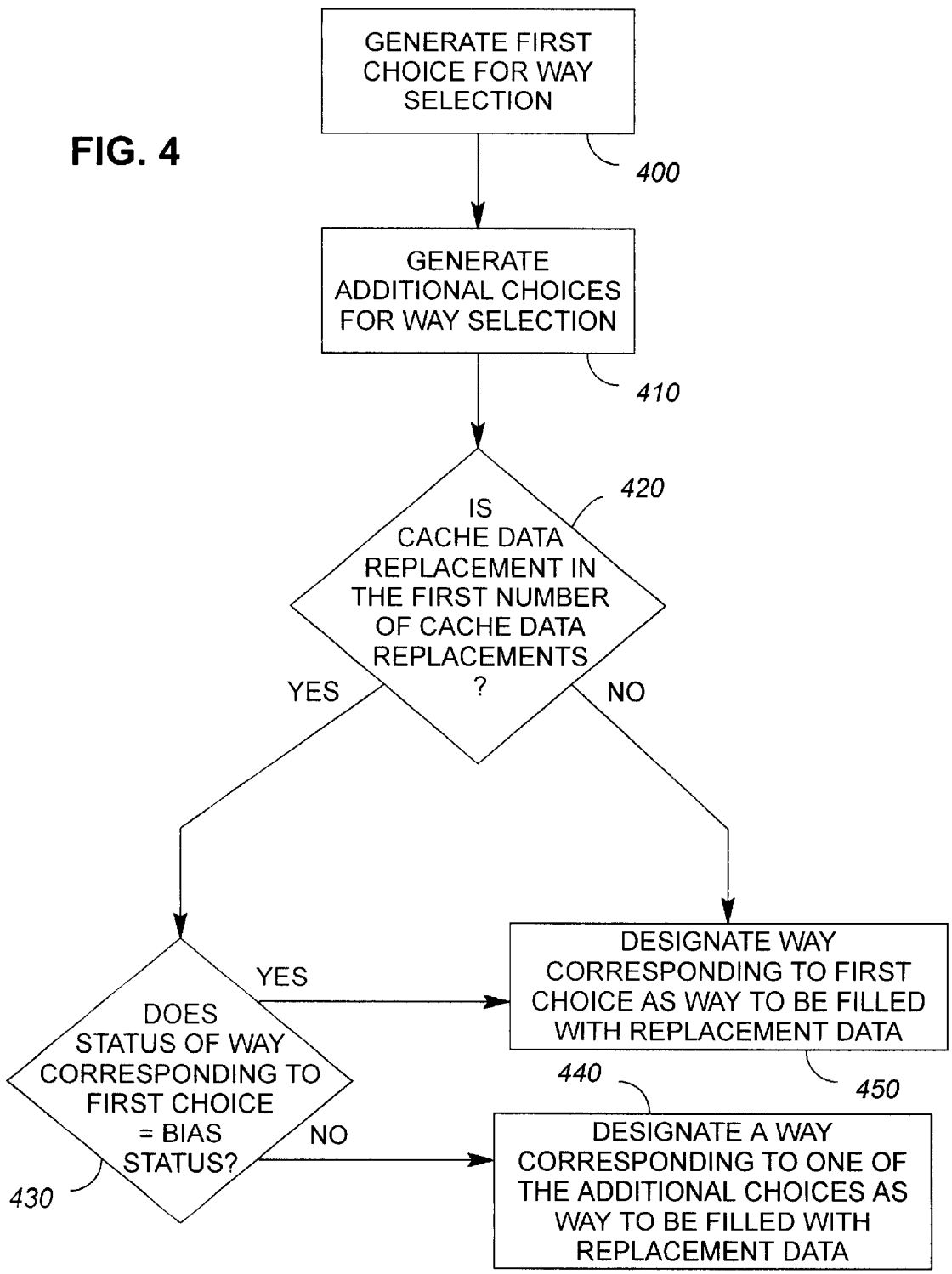
FIG. 4 illustrates a variation of the method illustrated in FIG. 3.

An alternative method for determining which way of an N-way set associative cache should be filled with replacement data upon generation of a cache miss when all of the ways contain valid data is generally illustrated in FIG. 4. The method illustrated in FIG. 4 also comprises generating a first choice for way selection 400 and at least one additional choice for way selection 410. For a first number of cache data replacements 420, a way corresponding to one of the additional choices is designated as the way to be filled with replacement data if the status of the way corresponding to the first choice differs from a bias status 430, 440—otherwise, the way corresponding to the first choice is designated as the way to be filled with replacement data 430, 450. However, for a second number of cache data replacements 420, the way corresponding to the first choice is always designated as the way to be filled with replacement data 450.

Figure 6:
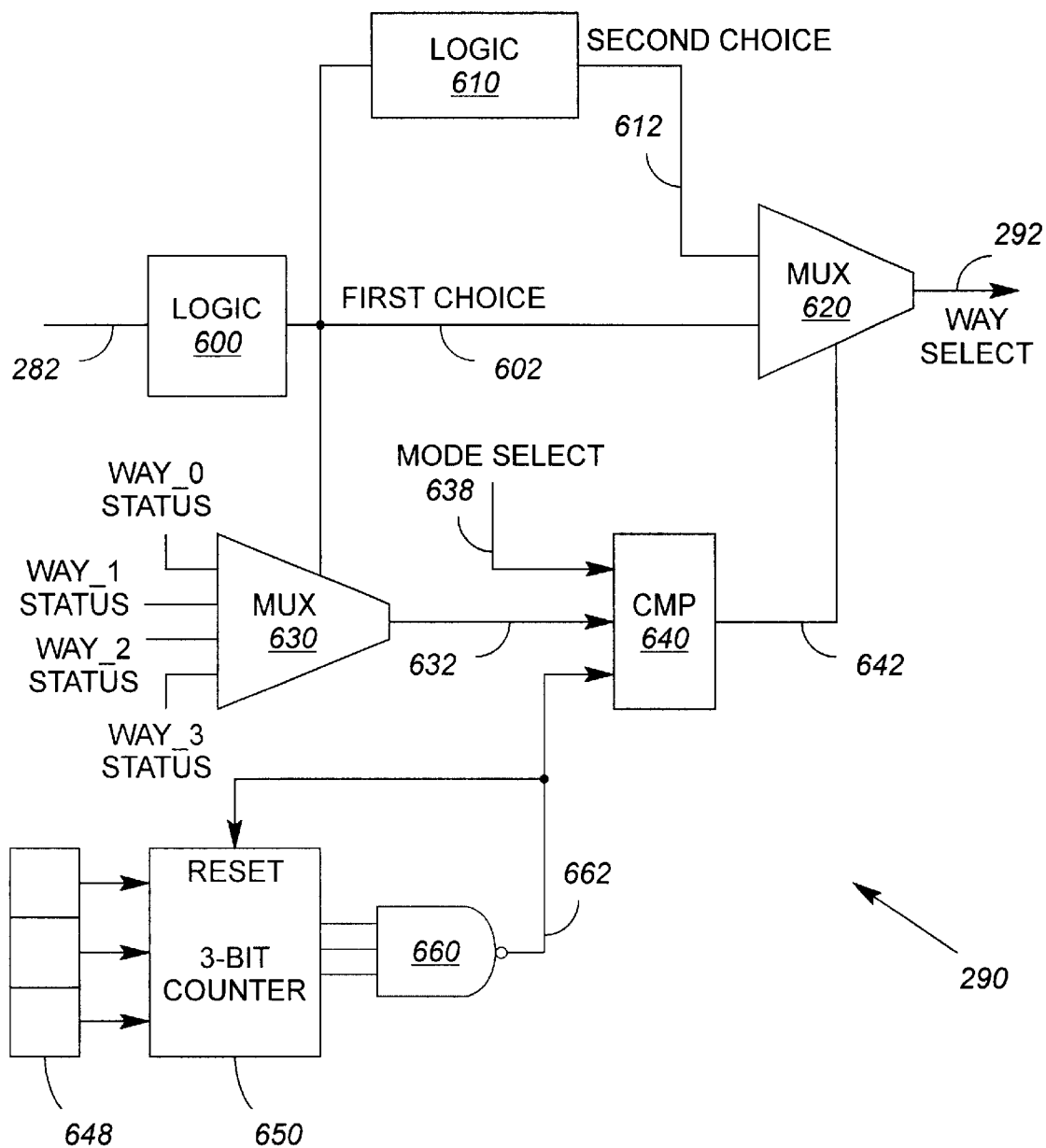
FIG. 6 illustrates an embodiment of the way selection logic found in FIG. 5.

Apparatus 290 which can be used to implement either of the above methods is generally illustrated in FIG. 6. The apparatus comprises logic for implementing a first way selection algorithm 600 and logic for implementing at least one additional way selection algorithm 610. These logic elements 600, 610 are triggered by a cache miss 282 and exist for the purposes of respectively generating a first and at least one additional choice for way selection 602, 612. The FIG. 6 apparatus 290 also comprises first and second multiplexers 630, 620. The first multiplexer 630 receives status information from each of the N ways at its data inputs and then outputs status information 632 for the way corresponding to the first choice for way selection 602. The second multiplexer 620 receives the first and at least one of the at least one additional choices for way selection 602, 612 at its data inputs and outputs a way selection 292 in response to an output 642 of bias logic 640. The bias logic 640 determines whether the status information 632 for the way corresponding to the first choice for way selection 602 differs from a programmed bias status.

Having generally set forth various embodiments of the invention, the invention will now be explained in greater detail.

Figure 1:
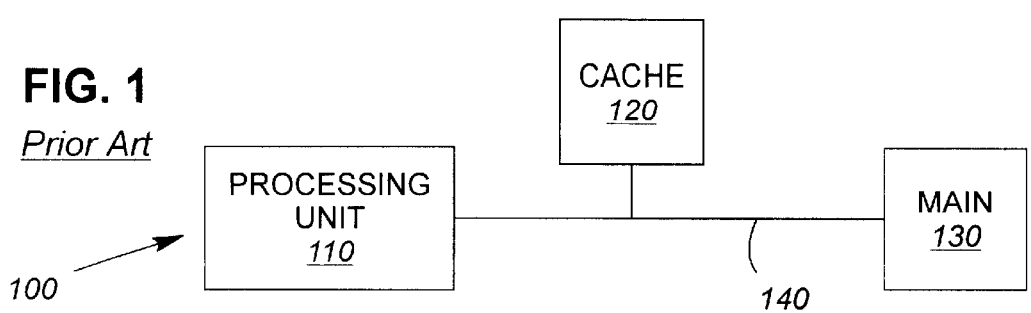
FIG. 1 illustrates an exemplary interconnection between a processing unit, a cache and a main memory in a single processor computer system.

FIG. 1 illustrates an exemplary environment 100 in which the invention might be implemented. The environment 100 comprises a processing unit 110, a cache 120 and a main memory 130, all of which are interconnected by a bus 140. Under normal operation, the processing unit 110 executes instructions and consumes data stored in the cache 120 until such time that the cache 120 generates a cache "miss". A cache miss occurs as a result of the cache 120 not having in its store an instruction or data value which has been requested by the processing unit 110. In response to a cache miss, the missing instruction or data value is typically retrieved from the main memory 130, written into the cache 120, and then transmitted to the processing unit 110 for subsequent execution or consumption.

Figure 2:
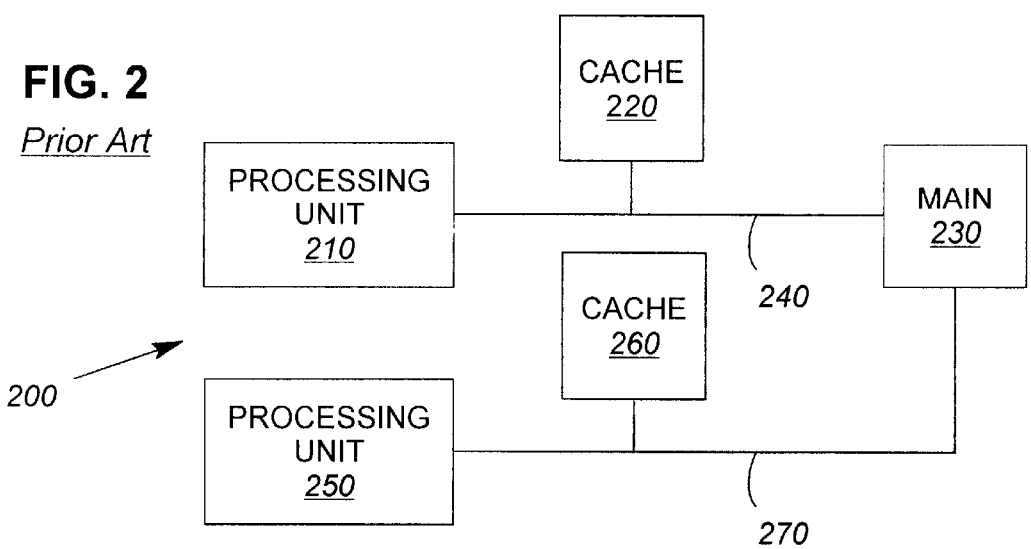
FIG. 2 illustrates exemplary interconnections between processing units, caches and a main memory in a multi-processor computer system.

FIG. 2 illustrates an alternate environment 200 in which the invention might be implemented. The environment 200 comprises a first processing unit 210 and cache 220 which are connected to a main memory 230 via a first bus 240, and a second processing unit 250 and cache 260 which are connected to the main memory 230 via a second bus 270. In operation, either of the processing units 210, 250 can, retrieve instructions and data from the main memory 230, store the instructions and data in its associated cache 220, 260, and then execute the instructions or consume the data as needed. However, to maintain the coherency of the data stored in the main memory 230, safeguards must be taken to insure that the data held in the main memory 230 is not fetched by both of the processing units 210, 250, operated upon by one or both of the processing units 210, 250, and then written back into the main memory 230 such that one of the processing units 210, 250 is not informed that the data stored in its cache 220, 260 is not a true copy of the data currently stored in a corresponding main memory location. An exemplary implementation of such coherency checking apparatus is not disclosed herein, as it is believed that a discussion of same is not critical to an understanding of the invention, and implementations of same are well known by those skilled in the art.

The environments 100, 200 illustrated in FIGS. 1 and 2 are meant to be exemplary only, and should not be understood to limit the scope of the invention in any way.

As discussed in the above paragraphs, the caches 120, 220, 260 illustrated in FIGS. 1 and 2 will from time to time generate a cache miss (or "miss"). Upon generation of such a miss, an instruction or data value (collectively referred to from now on as "data") is retrieved from main memory 130, 230 and then written into the cache which generated the miss. If the cache is an N-way set associative cache, the "way" in which the retrieved data will be stored needs to be determined in advance of writing the retrieved data into the cache. If one or more ways in the cache hold invalid data, then it is preferable to store data retrieved from main memory in one of these invalid ways. However, if all of the ways hold valid data, then a choice must be made as to which way will be replaced with the data retrieved from main memory 130, 230. Common schemes for selecting which way to replace include the round robin approach, the random approach, and the least recently used (LRU) approach.

With the round robin approach, a counter is programmed to select a given way (e.g., way__0) for replacement after a first cache miss. After a second cache miss, the counter is incremented so that way__1 is selected for replacement. After a third cache miss, the counter is incremented so that way__2 is selected for replacement, and so on. In an N-way cache, upon replacing data stored in the Nth way, the counter is reset so that data in way__0 is once again replaced. So that a round robin counter need not be maintained for every cache index, a global round robin counter can be maintained for an entire cache. As a result, a first cache miss in set__15 and a second cache miss in set__320 would each trigger an incrementation of the same global round robin counter. A round robin approach to way selection is straightforward and cost-effective to implement. However, it fails to take into account factors such as 1) whether the replaced data will be needed again in the very near future, or 2) whether replacement of the data will require a write-back of data into main memory.

Way selection may also be determined using a random approach. With a random approach, a random number generator (or in most cases, a pseudo-random number generator) is configured to generate a way number each time a cache encounters a miss. The benefits and detriments of a random approach to way selection are the same as the benefits and detriments of a round robin approach.

With an LRU approach to way selection, cache line specific data is maintained so that the way holding the least recently used cache line (or an approximation of same) is replaced with new data. Since an LRU approach requires additional data to be maintained for each line of data stored in a cache, it is expensive to implement. However, it often provides better performance over way selection using a round robin or random approach.

In accordance with the invention, FIG. 3 illustrates a new method for determining way selection after a cache miss. The method is based in part on an analysis of the status of a cache line which is preliminarily slated for replacement. Cache line status information, as defined herein, is any information which is tracked in conjunction with the maintenance of a cache line. Preferably, the status information is information which is maintained for a purpose other than way selection so that way selection does not require the maintenance of status information which serves no other purpose outside of its use in way selection. In other words, although status information may comprise information such as a least recently used indication, it preferably does not. For example, status information might include an indication as to whether a cache line is shared or private. A shared cache line is one that provides a processor with read only access to its data. A private cache line is one that provides a processor with read/write access to its data. Status information might also include an indication as to whether a cache line is clean or dirty. A clean cache line stores data which has not been modified since being retrieved from main memory 130, 230. A dirty cache line stores data which has been modified since being retrieved from main memory.

In the preferred embodiments discussed herein, cache status information comprises both a shared/private indication and a clean/dirty indication.

As illustrated in FIG. 3, way selection in accordance with the present invention involves the generation of a first choice for way selection 300 and at least one additional choice for way selection 310. Although the way selection choices may be generated independently, it is preferred that the additional choices be generated as functions of the first so as to avoid the possibility of duplication in the choices. In a preferred embodiment of the method, only first and second choices are generated. However, one skilled in the art will readily understand how to implement the invention using more than two choices for way selection. The first choice may be generated in any known manner, but is preferably generated using a global round robin approach or random approach. The second choice may also be generated in any known manner, but is preferably generated by adding a programmed constant to the first choice (e.g., the first choice plus two).

After generating the first and second choices 300, 310, the first choice is used to retrieve the status of the way it designates. This status information is then compared to a programmed bias status to determine whether the status of the first choice way selection differs from the bias status 320. If it does differ, the way corresponding to the second choice for way selection is designated to be filled with replacement data 330. If the bias status and the status corresponding to the first choice way selection agree, then the way corresponding to the first choice for way selection is designated to be filled with replacement data 340.

As will be appreciated by one skilled in the art, the FIG. 3 method provides for more meaningful way selection than a simple round robin or random approach, yet does so with very little additional overhead. Furthermore, if the bias status is programmable, the FIG. 3 method can provide more meaningful way selection than a least recently used approach, as way selection can be optimized based on factors such as 1) the available bandwidth of a bus 140 to which a cache 120 and a main memory 130 are attached, and 2) the number of processing units 210, 250 and caches 220, 260 which retrieve data from a common main memory 230.

In a system 100 which has limited memory bus bandwidth, system performance will most likely be optimized by programming the bias status to favor the replacement of cache lines that do not require a write-back to main memory 130 (e.g., shared lines or clean lines). On the other hand, in a system 200 with more than one processing unit 210, 250 and/or cache 220, 260 accessing a common main memory 230, system performance will most likely be optimized by programming the bias status to favor the replacement of lines which do require a write-back to main memory (e.g., favoring dirty ways to thereby insure that updated data is written back into main memory as quickly as possible so that other processing units have ready access to it without waiting for a coherency check to trigger the write-back of needed data).

FIG. 4 illustrates an alternate embodiment of the method disclosed in FIG. 3. In the FIG. 4 method, a first and at least one additional choice for way selection are generated 400, 410 as in FIG. 3. However, FIG. 3's method for choosing between the first and at least one additional choices 430–450 is only applied for a first number of cache data replacements 420. For a second number of cache data replacements 420, way selection defaults to the first choice 450.

It is possible that the combination of status information for a set of ways might leave one of the ways not being selected for replacement for a long time, thereby preserving valid but stale data in a cache. To reduce the possibility of this happening, the FIG. 4 method helps to insure that each way of a cache will be designated for replacement with some periodicity.

Figure 5:
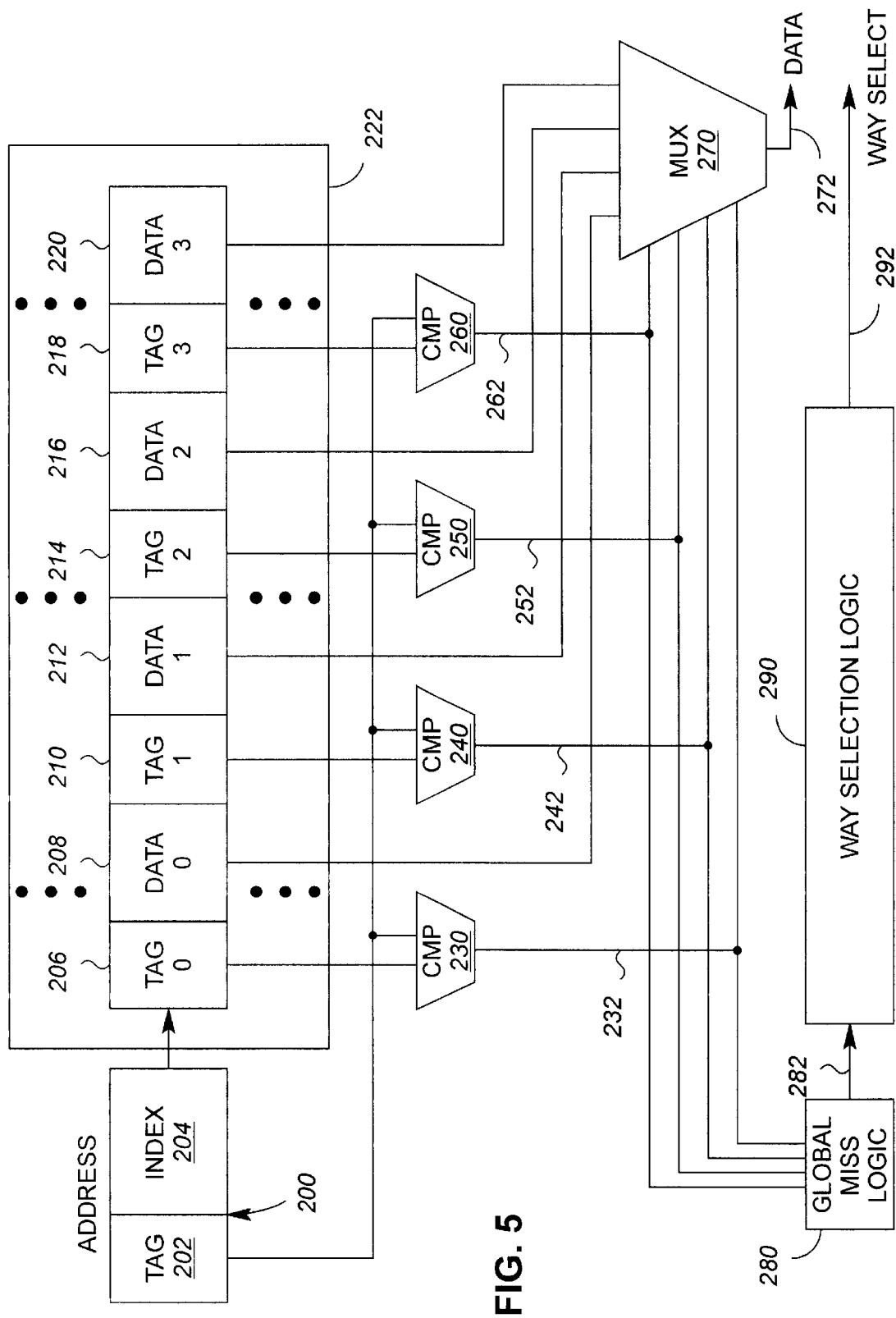
FIG. 5 illustrates various components of a 4-way set associative cache.

FIGS. 5 and 6 illustrate a preferred embodiment of a cache 120, 220, 260 which can implement either of the methods disclosed in FIGS. 3 and 4. By way of example only, FIG. 5 illustrates a 4-way set associative cache 222 comprising an arbitrary depth. When data is requested by a processing unit 110, 210, 250, the data's address 200 is supplied to the cache 222. A first portion of the address 200 forms an index 204 into the cache 222, and a second portion of the address 200 forms a tag 202. The index 204 addresses a line of data 208, 212, 216, 220 stored in each way of the cache 222 (i.e., a set), as well as the tags 206, 210, 214, 218 which correspond to the addressed lines of data 208, 212, 216, 220. The lines of data 208, 212, 216, 220 are output from their storage arrays and routed to the data inputs of a multiplexer 270. Each of the tags 206, 210, 214, 218 is routed to a comparator 230, 240, 250, 260 corresponding to the way in which it is stored. The tag 202 of the requested data's address 200 is routed to each these comparators 230, 240, 250, 260. The output 232, 242, 252, 262 of each comparator 230, 240, 250, 260 therefore generates a signal which is indicative of a hit or a miss in a particular way of the cache 222. A hit means that the two tags (e.g., 202, 206) presented to a comparator 230 are identical, and the requested data is stored in the way corresponding the comparator 230. A miss means that data is not stored in a particular way. The outputs 232, 242, 252, 262 of the tag comparators 230, 240, 250, 260 are provided to the cache line multiplexer 270 as control inputs and select the data corresponding to the "hit" way for output from the cache. If no way generates a hit, a logical OR 280 of the way miss signals 232, 242, 252, 262 will yield a global miss signal 282 (or cache miss signal). It is this signal 282 that triggers the way selection logic 290 of the invention.

Details of FIG. 5's way selection logic 290 are shown in FIG. 6. The cache miss signal 282 is received by logic 600 for implementing a first way selection algorithm. As previously discussed this logic 600 can implement a round robin, random or other known way selection algorithm. The output 602 of this logic 600 is input to logic 610 for implementing a second way selection algorithm. A preferred embodiment of this logic 610 increments the first choice for way selection 602 by two. The first choice for way selection 602 is also provided as a control to a multiplexer 630 which receives status information for each of the cache lines 208, 212, 216, 220 which are indexed in FIG. 5. The first choice for way selection 602 therefore selects the status information corresponding to the cache line stored in the way designated by the first choice for way selection 602, and outputs this status information 632 to a comparator 640. The comparator 640 can be hard-wired to compare a single bias status to the status information 632 output from the status selection multiplexer 630, or can be programmed to compare one of a number of bias statuses to the status information 632 output from the status selection multiplexer 630. In the latter case, the bias status of the comparator 640 can be selected via a mode select signal 638. The output 642 of the comparator 640 serves to control a second multiplexer 620 which receives the first and second choices for way selection 602, 612 at its data inputs. In this manner, the first choice for way selection 602 is used to designate the way 292 to be filled with replacement data when the bias status agrees with the status information 632 received from the status selection multiplexer 630, and the second choice for way selection 612 is used to designate the way 292 to be filled with replacement data when the bias status differs from the status information 632 received from the status selection multiplexer 630.

To implement the method disclosed in FIG. 4, the FIG. 6 comparator 640 may be enabled for a first number of cache data replacements by an enable signal 662 generated in response to the output of a 3-bit countdown counter 650. The bits of the counter 650 may be NANDed together 660 to generate the enable signal 662. In addition to enabling the status comparator 640, the enable signal 662 can be used to reset the counter 650 so that the output 292 of the way selection logic 290 defaults to the first choice for way selection 602 once out of every eight way selections. Alternatively, the enable signal 262 can trigger a load of the 3-bit counter 650 with a value stored in a programmable register 648. In this manner, the status comparator 640 can be enabled once every 1–8 times.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for determining which way of an N-way set associative cache should be filled with replacement data upon generation of a cache miss when all of the ways contain valid data, comprising:

a) generating a first choice for way selection;

b) generating at least one additional choice for way selection; and c) if the status of the way corresponding to the first choice differs from a bias status, designating a way corresponding to one of the additional choices for way selection as the way to be filled with replacement data, else designating the way corresponding to the first choice as the way to be filled with replacement data.

2. A method as in claim 1, wherein the first choice for way selection is determined using a round robin approach.

3. A method as in claim 2, wherein the round robin approach is a global round robin approach.

4. A method as in claim 1, wherein the first choice for way selection is determined using a random approach.

5. A method as in claim 1, wherein the first choice for way selection is determined using a least recently used approach.

6. A method as in claim 1, wherein one of the additional choices for way selection is equal to the first choice for way selection incremented by a fixed constant.

7. A method as in claim 6, wherein the fixed constant is greater than one.

8. A method as in claim 1, wherein one of the additional choices for way selection is equal to the first choice for way selection incremented by a random number.

9. A method as in claim 1, wherein the bias status is programably determined as a function of a private/shared and clean/dirty status of each way.

10. A method as in claim 1, wherein the bias status favors shared ways over private ways.

11. A method as in claim 1, wherein the bias status favors private clean ways over private dirty ways.

12. A method as in claim 1, wherein the bias status favors private dirty ways over private clean ways and shared ways.

13. A method as in claim 1, wherein the bias status disfavors private dirty ways over private clean ways and shared ways.

14. A method as in claim 1, wherein the at least one additional choice for way selection consists of only a second choice for way selection.

* * * * *

UNITED STATES PATENT AND TRADEMARK OFFICE
CERTIFICATE OF CORRECTION

PATENT NO. : 6,542,965 B2
DATED : April 1, 2003
INVENTOR(S) : Gregg B. Lesartre

It is certified that error appears in the above-identified patent and that said Letters Patent is hereby corrected as shown below:

<u>Title page, Item [54] and Column 1, line 2,</u>
Delete "CABLE" and insert therefor -- CACHE --

Signed and Sealed this

Nineteenth Day of October, 2004

JON W. DUDAS
*Director of the United States Patent and Trademark Office*